US008019225B2

(12) United States Patent
Daghighian et al.

(10) Patent No.: US 8,019,225 B2
(45) Date of Patent: *Sep. 13, 2011

(54) INTELLIGENT TRANSMITTER MODULE

(75) Inventors: Henry M. Daghighian, Mountain View, CA (US); The-Linh Nguyen, San Jose, CA (US); Luke M. Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 11/968,581

(22) Filed: Jan. 2, 2008

(65) Prior Publication Data
US 2008/0292311 A1 Nov. 27, 2008

Related U.S. Application Data

(60) Provisional application No. 60/940,043, filed on May 24, 2007.

(51) Int. Cl.
*H04B 10/00* (2006.01)

(52) U.S. Cl. .......... 398/135; 398/136; 398/138; 398/164

(58) Field of Classification Search .................... 398/25, 398/33, 135–138, 164
See application file for complete search history.

(56) References Cited

U.S. PATENT DOCUMENTS

| 6,947,672 | B2 * | 9/2005 | Jiang et al. | 398/135 |
|---|---|---|---|---|
| 2004/0197055 | A1 * | 10/2004 | Fischer et al. | 385/92 |
| 2006/0002415 | A1 * | 1/2006 | Heston et al. | 370/419 |
| 2006/0067705 | A1 * | 3/2006 | Paulsen | 398/164 |

OTHER PUBLICATIONS

Chris H. Dick, Design and implementation of high-performance FPGA signal processing datapaths for software-defined radions, VMEbus Systems, Aug. 2001.
Tapan J. Chakraborty and Chen-Huan Chiang, A Novel Fault Injection Method for System Verification Based on FPGA Boundary Scan Architecture, ITC International Test Conference, 2002, pp. 923-929.
Jim Jackson, Fiber Optics System, EVLA Project Book, Chapter 7, Aug. 2001.
U.S. Appl. No. 12/130,123, filed May 30, 2008, Henry Meyer Daghighian.

* cited by examiner

*Primary Examiner* — Dalzid Singh
(74) *Attorney, Agent, or Firm* — Maschoff Gilmore & Israelsen

(57) ABSTRACT

An intelligent transmitter module ("ITM") includes a CDR circuit for equalizing and retiming an electrical data signal, a driver for generating a modulation signal and/or performing waveform shaping of the equalized and retimed signal, and an optical transmitter configured to emit an optical signal representative of the data signal. A linear amplifier may also be included to amplify the modulation signal when the optical transmitter is a laser with managed chirp. Alternately or additionally, a microcontroller with a 14-bit or higher A2D can be included to control and optimize operation of the ITM. In one embodiment, the CDR, driver, linear amplifier, and/or microcontroller are flip chip bonded to a first substrate while the laser with managed chirp is bonded to a second substrate. The first substrate may comprise a multi-layer high frequency laminate.

26 Claims, 10 Drawing Sheets

INTELLIGENT TRANSMITTER MODULE

CROSS-REFERENCE TO RELATED APPLICATIONS

The present application claims the benefit of priority of U.S. Provisional Application Ser. No. 60/940,043, entitled INTEGRATED TRANSMITTER OPTICAL SUBASSEMBLY, filed May 24, 2007, and fully incorporated herein by reference in its entirety.

BACKGROUND OF THE INVENTION

1. The Field of the Invention

The present invention relates generally to devices for high speed data transmission. More particularly, embodiments of the invention concern an intelligent transmitter module.

2. The Relevant Technology

Two often conflicting demands in the market for components used in optical networks are the demands for higher transmission speeds and miniaturization. The conflict is evident, for example, in trying to design modules suitable for use in SONET applications that can also achieve 10G and above telecommunication data transmission speeds. The high-speed nature of signal transmission demands a minimum number of electronic interconnects with a short path for electrical transmission between the components of the module. Electronic interconnects in the form of leads, flex circuits, and piecewise continuous ground connections pose a major challenge in meeting SONET jitter performance due to reflections and bandwidth limitations caused by transitions and discontinuity. Jitter compliance, signal integrity and electromagnetic compliance on the transmit side (e.g., CDR, laser driver, transmitter) is also a major challenge due to high frequency signal generation and reflections at each interface, which can be major sources of EMI emissions at Gigabit speeds and beyond.

The current dominant technology for achieving long haul (>80 km) optical transmission at and above 10G data rates utilizes Lithium Niobate Mach-Zehnder and InP Mach Zehnder modulators. Typically, however, modules implementing this technology are relatively expensive, large in size, and power hungry. One alternative solution for achieving 10G data rates in applications less than 100 km involves the use of directly modulated lasers or externally modulated lasers, which are often less expensive, smaller and less power hungry than Lithium Niobate Mach-Zehnder and InP Mach Zehnder modulators. However, adiabatic chirp generated in distributed feedback lasers and transient chirp in the modulator section of externally modulated lasers cause rapid distortion of the eye after fiber propagation. As a result, conventional directly modulated lasers and externally modulated lasers remain limited to applications less than 100 km.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to systems for high speed data transmission. Briefly summarized, embodiments of the invention are directed to an intelligent transmitter module or hybrid package including at least an optical transmitter, a clock and data recovery circuit ("CDR") or data retimer/equalizer, and a high current switching driver. In one embodiment, the optical transmitter comprises a temperature-controlled laser with chirp that is managed. In this case, the hybrid package may include the laser with associated components for managing chirp and controlling temperature, the CDR IC, the driver IC, and a linear amplifier IC to amplify the modulation signal to a large voltage/current needed to drive the laser. Further, a thermal chirp compensation circuit is integrated as part of the linear amplifier IC section to compensate for thermal chirp in the laser by adjusting the transmit power of the laser. Alternately or additionally, a microcontroller IC and one or more DAC or A/D functions can be included in the intelligent transmitter module hybrid package to control the optical transmitter and the electronics. Advantageously, integration of the aforementioned electronics ICs within the intelligent transmitter module reduces the number of interconnects in and out of the intelligent transmitter module, which improves signal integrity.

The data retimer/equalizer circuit, driver, and optionally the microcontroller can be combined as a single integrated circuit. This integrated circuit and the linear amplifier integrated circuit can be configured as a micro electronic hybrid mounted on a first substrate while the laser and associated components are bonded to a separate substrate. Various die attach techniques can be used for creation of the microelectronic hybrid integration, including flip chip bonding. The first substrate may comprise a multi-layer high frequency laminate substrate, a hybrid ceramic substrate, and/or a thin film substrate. The first substrate is thermally isolated from the second substrate to minimize heat transfer between the laser/associated components and the other components of the intelligent transmitter module.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
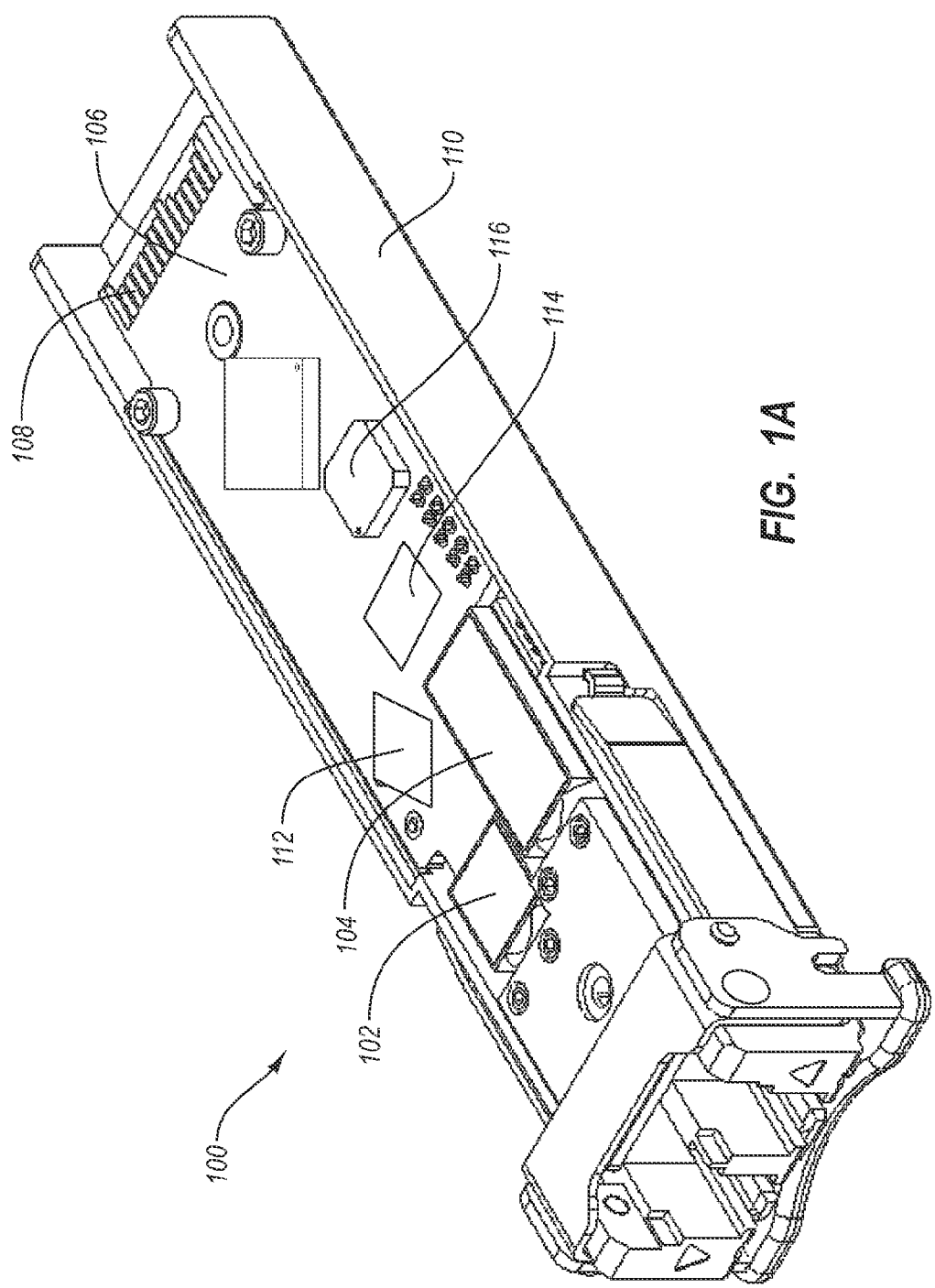
FIGS. 1A and 1B are perspective views of example optoelectronic devices in which embodiments of the present invention can be implemented.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Embodiments of the invention relate to an intelligent transmitter module that can be used in various applications, including SONET, SDH, Ethernet, Fiber Channel and other applications. As used herein, an "intelligent transmitter module" is a TOSA-like component that includes an optical transmitter, similar to a TOSA, and additionally includes a CDR and driver as well as one or more other electronic components. In particular, an intelligent transmitter module, according to one embodiment of the invention, includes a low power CDR, a driver, a linear amplifier (voltage amplifier), and a laser with chirp that is managed (with a Wavelength locker/Optical Spectrum Reshaper ("OSR")), with a 4-channel DAC. In other embodiments of the invention, a microcontroller is integrated with the CDR and driver in one IC chip. The linear amplifier can be in discrete form. The integrated IC and linear amplifier can be assembled on a multi-layer hybrid substrate using flip chip bonding techniques and can be isolated thermally from a temperature controlled optical section of the intelligent transmitter module. Some or all of the aforementioned components are disposed within the intelligent transmitter module, which can additionally include one or more thermoelectric coolers ("TECs") and one or more thermistors.

In one embodiment of the invention, the laser with managed chirp comprises a directly modulated distributed feedback laser (or an externally modulated laser with a DFB having a relaxation oscillation frequency $f_R$>20 GHz), an optical spectrum reshaping filter, and a wavelength locker comprising a beam splitter, two photodiodes, and the optical spectrum reshaping filter. Advantageously, embodiments of the invention enable the use of a directly modulated distributed feedback laser (or externally modulated laser with a DFB ($f_R$>20 GHZ)) for long-haul applications by suppressing chirp. Moreover, the integration of the CDR, driver, linear amplifier, and laser according to embodiments of the invention can provide numerous other benefits, including improved microwave performance due to minimizing interconnects, reduced EMI emissions due to improved containment of electronic circuitry, reduced manufacturing costs and improved control and capabilities due to micro-electronic integration of components, and increased space (e.g., in transceiver and/or transponder modules) for additional components due to the moving of the CDR and driver to the intelligent transmitter module.

The present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. As used herein, a "transceiver" is an optoelectronic device that converts one or more received serial electrical signals to a corresponding number of serial optical signals and/or that converts one or more received serial optical signals to a corresponding number of serial electrical signals. In contrast, a "transponder" converts two or more received parallel electrical signals to a fewer number of serial optical signals and/or converts one or more received serial optical signals to a greater number of parallel electrical signals.

Optoelectronic devices can be used, for example, in telecommunications networks, local area networks, metro area networks, storage area networks, wide area networks, and the like. The principles of the present invention may be implemented in optoelectronic devices of any form factor currently available or that may be developed in the future for 10G, 40G, and 100G signaling, without restriction. It will be appreciated, however, that the optoelectronic devices need not comply with standardized form factor requirements and may have any size or configuration necessary according to a particular design. The principles of the present invention are suitable for use with, for example, 10G, 40G and other transmission speeds.

I. Example Operating Environment

FIG. 1A illustrates an example optical transceiver 100 in which the principles of the present invention may be employed. While the optical transceiver 100 will be described in some detail, the optical transceiver 100 is described by way of illustration only, and not by way of restricting the scope of the invention. As depicted, the transceiver shown in FIG. 1 includes various components, including a receiver optical subassembly ("ROSA") 102, an intelligent transmitter module ("ITM") 104, and a printed circuit board 106. The transceiver 100 may additionally include two flex circuits (not shown), one each used to electrically connect the ROSA 102 and the ITM 104 to a plurality of conductive pads located on the PCB 106. An edge connector 108 is located on an end of the PCB 106 to enable the transceiver 100 to electrically interface with a host (not shown here). As such, the PCB 106 facilitates electrical communication between the ROSA 102/ITM 104, and the host. In addition, the above-mentioned components of the transceiver 100 are partially housed within a housing portion 110. Though not shown, a shell can cooperate with the housing portion 110 to define a covering for the components of the transceiver 100.

As illustrated in FIG. 1A, PCB 106 includes circuitry and electronic components for use with the ITM 104 and ROSA 102 in performing the optical signal transmission and reception activities of the transceiver 100. Among the components included on some embodiments of the PCB 106 are a post amplifier, a receiver CDR 112, transmitter DC bias circuitry 114, TEC control circuitry 116, and a microcontroller. Various electronic components typically included on the PCB of a conventional transceiver are integrated into the ITM 104, including a high current switching driver (e.g., a VCSEL driver), transmit CDR, linear amplifier and/or microcontroller according to embodiments of the invention. It will be appreciated that two or more of these components can be integrated on a single IC chip within the ITM 104 while other components can be separately disposed within the ITM 104.

Figure 1B:
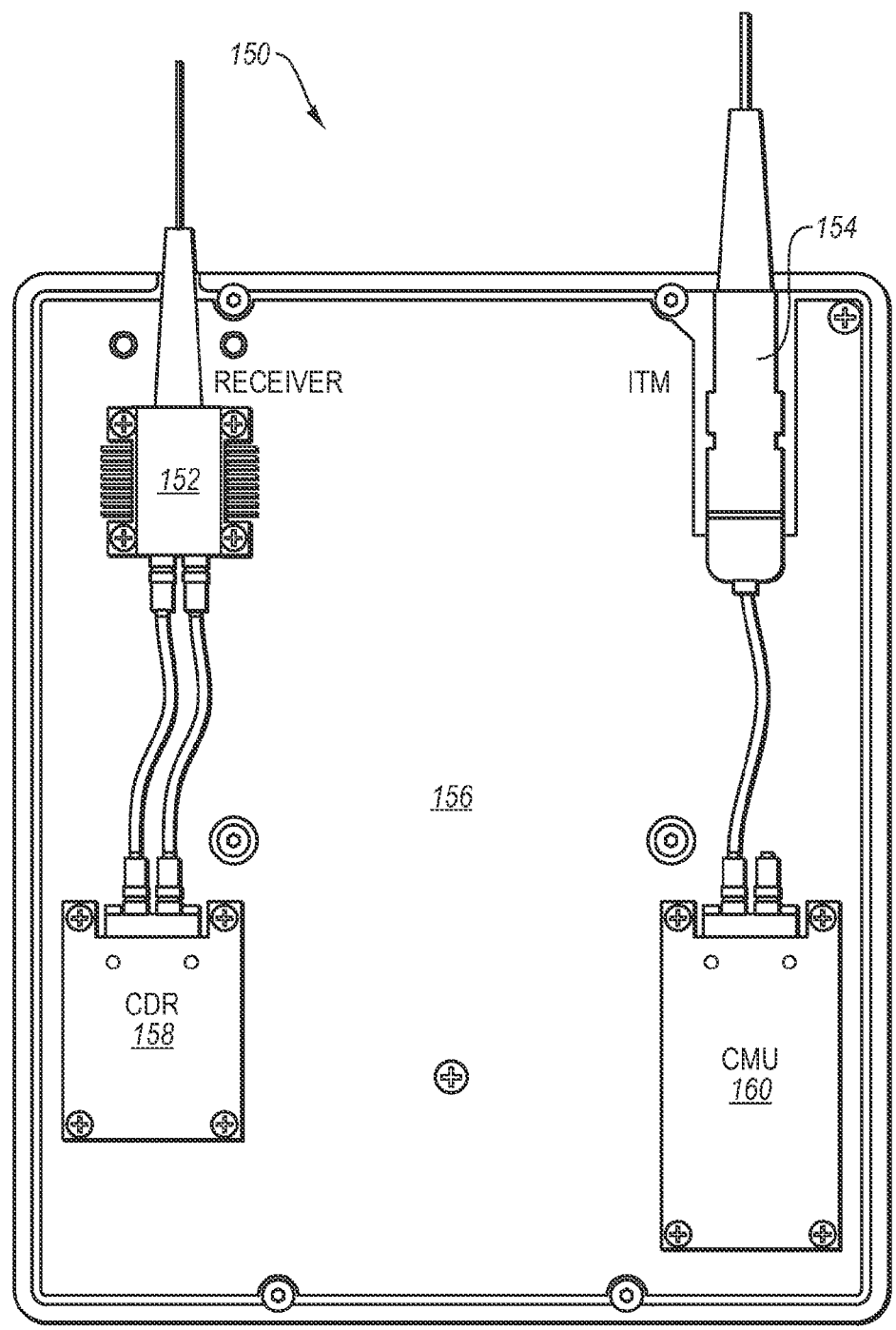

FIG. 1B illustrates another example environment in which the principles of the present invention may be employed. In particular, FIG. 1B illustrates an example optical transponder 150, which is illustrative only, and should not be construed to limit the invention. The transponder 150 includes various components, including a ROSA 152, an ITM 154, and a printed circuit board 156. The transponder 150 may additionally include flex circuits, wire bonds, and the like, to electrically connect the ROSA 152 and the ITM 154 to the PCB 156. Various pins from the PCB 156 enable the transponder 150 to electrically interface with a host (not shown). As such, the PCB 156 facilitates electrical communication between the ROSA 152/ITM 154, and the host.

PCB 156 includes circuitry and electronic components for use with the ITM 154 and ROSA 152 in performing the optical signal transmission and reception activities of the transponder 150. Among the components included on some embodiments of the PCB 156 are a post amplifier, a demultiplexer 158, a multiplexer 160, transmitter DC bias circuitry, TEC control circuitry, and a microcontroller. Similar to FIG. 1A, various electronic components typically included on the PCB of a conventional transponder are integrated into the ITM 154, including a high current switching driver (e.g., a VCSEL driver), CDR, linear amplifier and/or microcontroller.

FIGS. 1A and 1B illustrate two example environments in which an intelligent transmitter module according to embodiments of the invention can be implemented. One skilled in the art will appreciate, with the benefit of the present disclosure, that the environments of FIGS. 1A and 1B are illustrative only and that embodiments of an intelligent transmitter module can be implemented in many different environments in addition to those discussed herein.

II. Intelligent Transmitter Module

Figure 2A:
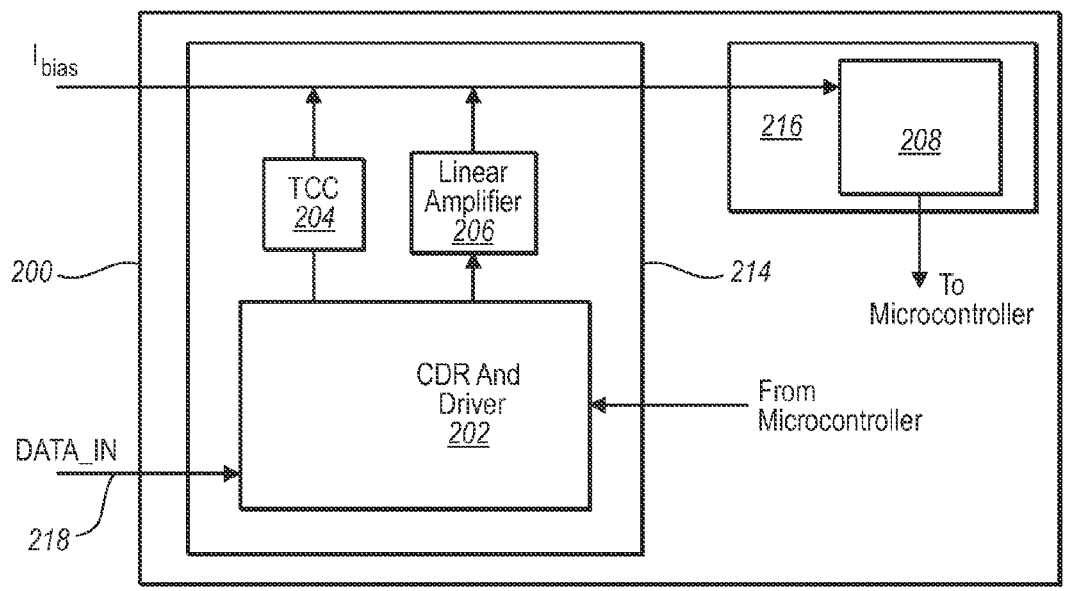
FIGS. 2A and 2B illustrate two embodiments of an intelligent transmitter module according to the invention.
Figure 2B:
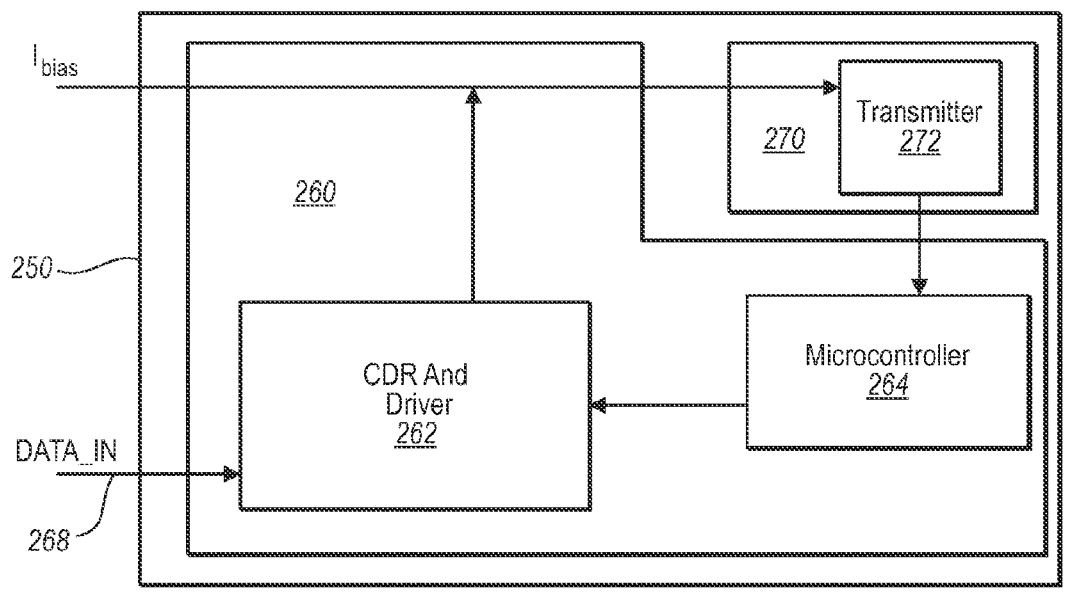

FIGS. 2A and 2B depict two embodiments of an intelligent transmitter module in simplified block form. In FIG. 2A, ITM 200 includes a first substrate 214 and a second substrate 216. Various electronic components typically bonded to or manufactured on the PCB of a conventional optoelectronic device are bonded to or manufactured on the first substrate 214, including a CDR and driver IC 202, a thermal chirp compensation ("TCC") circuit 204, and a linear amplifier 206. The second substrate 216 includes a laser with chirp that is managed 208, which is one type of optical transmitter that can be implemented in embodiments of the invention.

In FIG. 2B, ITM 250 also includes a first substrate 260 and a second substrate 270. The first substrate 260 includes various electronic components, including a CDR and driver IC 262 and a microcontroller 264. The second substrate 270 includes an optical transmitter 272. It is appreciated that the embodiments of FIGS. 2A and 2B are illustrative only and that different and/or additional electronic and/or optical components (other than those illustrated) can be included in an ITM. For instance, the ITM 200 of FIG. 2A can have an optical transmitter other than a laser with managed chirp 208, and can additionally include a microcontroller bonded to the first substrate 214. Alternately or additionally, the ITM 250 of FIG. 2B can include a linear amplifier, TCC circuit, and the like, and/or the transmitter 272 may comprise a laser with managed chirp.

In operation, the ITM 200 of FIG. 2A receives a differential electrical signal 218 for transmission as a data-carrying optical signal. At the CDR and driver IC 202, the electrical signal is equalized and retimed by a CDR stage. Alternately or additionally, the CDR stage can recover a clock from the electrical signal for use in a transponder, for instance. The CDR stage equalizes and retimes the electrical data signal 218 using a clock signal from a host. In another embodiment, the CDR stage can equalize and retime the data signal 218 using the data signal itself, without using a clock signal. The ITM 200 can also be implemented in applications where it is unnecessary to retime the electrical data signal, in which case the CDR stage may be bypassed to save power. These scenarios are links with adequate jitter budget without retiming. Examples of such links are those used in SFP+SR and LR MSA. One embodiment of an integrated CDR and driver 202 will be discussed in more detail below with reference to FIGS. 3A and 3B.

The output of the CDR stage is provided within the CDR and driver 202 to a driver stage configured to generate a modulation signal. In one embodiment, the driver stage comprises a VCSEL driver capable of driving 50 ohm impedance loads. The driver stage of the CDR and driver 202 is further configured to perform wave-form shaping of the retimed electrical data signal, including pre-emphasis, de-emphasis, jitter pre-compensation, asymmetric rise fall time, asymmetric boost, cross-point adjust, modulation amplitude adjust, polarity control, laser DC bias control, and the like or any combination thereof.

For long-wave applications and in other embodiments of the invention, the modulation signal from the CDR and driver 202 is amplified by linear amplifier 206 prior to being provided to the laser 208, which emits an optical signal representative of the electrical signal 218. As will be discussed in greater detail below, the operation of the laser 208 depends on managing the chirp of a distributed feedback laser. For this reason, the TCC circuit 204 is included in the ITM 200 for providing thermal chirp compensation. As shown, the ITM 200 may interact with an external microcontroller configured to perform digital diagnostic functions and/or to optimize performance of the ITM 200.

The operation of the ITM 250 of FIG. 2B is similar to that of ITM 200. The ITM 250, however, is configured for short-wave applications (e.g., 850 nm) as shown and includes a short-wave vertical cavity surface emitting laser ("VCSEL") or other short-wave transmitter 272. In this case, the output of the CDR and driver 262 can be used to directly drive transmitter 272 to emit an optical signal representative of the electrical signal 268. Additionally, the ITM 250 includes an internal microcontroller IC 264 configured to perform digital diagnostic functions and/or to optimize the performance of the ITM 250. For instance, the microcontroller may monitor transmitter temperature, transmitter optical output power, and the like or any combination thereof. Further, the microcontroller 264 may adjust settings on the CDR and driver IC 262 and 272. In some embodiments of the invention, the microcontroller 264 (or an externally provided microcontroller in the embodiment of FIG. 2A) may facilitate wavelength locking, filter tuning, electrical cross point adjust, thermal chirp management control, and the like or any combination thereof.

While the embodiments of FIGS. 2A and 2B have been described as implementing a laser with managed chirp or a short-wave (e.g., 850 nm) VCSEL, other transmitters having any suitable configuration can alternately be implemented. For instance, the transmitter used in the embodiment of FIG. 2A or 2B may alternately or additionally comprise a laser integrated modulator ("LIM"), a long-wave (e.g., 1550 nm) VCSEL, a distributed feedback ("DFB") laser, a cooled or uncooled externally modulated laser, an externally modulated laser with a wavelocker, a cooled or uncooled directly modulated laser, a directly modulated laser with a wavelocker, and the like or any combination thereof. Further, the transmitters 208, 272 can be configured to operate at data rates of 10 gigabits per second and more.

According to one embodiment of the invention, the ITMs 200, 250 are configured to support multiple communication protocols, including two or more of SONET, SDH, Ethernet, Fiber Channel, and others. In order to support multiple protocols, the ITMs 200, 250 include the CDR stage of the CDR and driver IC 202, 262 for equalization and retiming of the electrical data signal 202 and/or clock recovery. As already mentioned, the CDR stage can be bypassed where clock recovery and/or equalization and retiming of the electrical data signal is not required. For instance, a host can communicate with a microcontroller external or internal to the ITMs 200, 250 over a suitable interface (e.g., SPI, MDIO, $I^2C$, etc.) to identify whether equalization and retiming is necessary. Accordingly, the microcontroller can then control the CDR stage of the CDR and driver IC 202, 262 to equalize and retime the electrical data signal 218, 268 or not.

In some embodiments of the invention, electronic components (e.g., linear amplifier IC, CDR and driver IC, and the like) within the ITM 200 (and/or 250) are flip chip bonded to the first substrate 214. Advantageously, flip chip bonding reduces the length of the interconnects between ICs 202, 206 and the substrate 214 to which the ICs are attached, thereby reducing signal degradation due to cross talk and parasitic capacitance and reducing EMI, etc. Notwithstanding the advantages of flip chip bonding, other bonding techniques may also be used to electrically couple the ICs 202, 206 to the substrate 214, including wire bonding, through-hole construction, and surface mount technology.

The substrate 214 may comprise, for instance, multilayer high frequency laminate or silicon wafer, and the like or any combination thereof. Alternately or additionally, the substrate 214 may comprise hybrid ceramic or thin film. In one embodiment in which a laminate is utilized, the substrate can include a first layer for a transmission line, a second layer for ground, a third layer for a power plane, and the like or any combination thereof. The substrate 214 may include blind and/or buried vias for electrically connecting components (e.g., ICs 202 and 206, passive elements such as filters, and the like) to the substrate 214.

In one embodiment of the invention, the ITM 200 (and/or 250) is hermetically sealed within a faraday cage to reduce the effects of EMI on the ITM and/or from the ITM. In this case, the number of high speed feedthroughs may be limited to as few as three: e.g., two for an incoming differential signal and one for ground. Various low speed DC feedthroughs, which are easier and less expensive to make than high speed feedthroughs, can be provided as well, e.g., $I_{Bias}$, TEC1$^+$, TEC1$^-$, TEC2$^+$, TEC2$^-$, Vcc1 (for the CDR and driver), Vcc2 (for the linear amplifier), ground, various control lines to interface with an external microcontroller, and the like or any combination thereof.

According to some embodiments of the invention, an ITM 200 or 250 is operated within a transceiver, transponder, or other module. In addition, the ITM 200 or 250 can be electrically coupled to a PCB or other circuitry within the module using a flex circuit to preserve signal integrity from the PCB to the ITM. Note, however, that since the ITM includes a CDR, leads can also be used between the PCB and ITM and losses in signal integrity due to the use of leads can be recovered by the CDR.

A. Integrated CDR and Driver IC

Figure 3A:
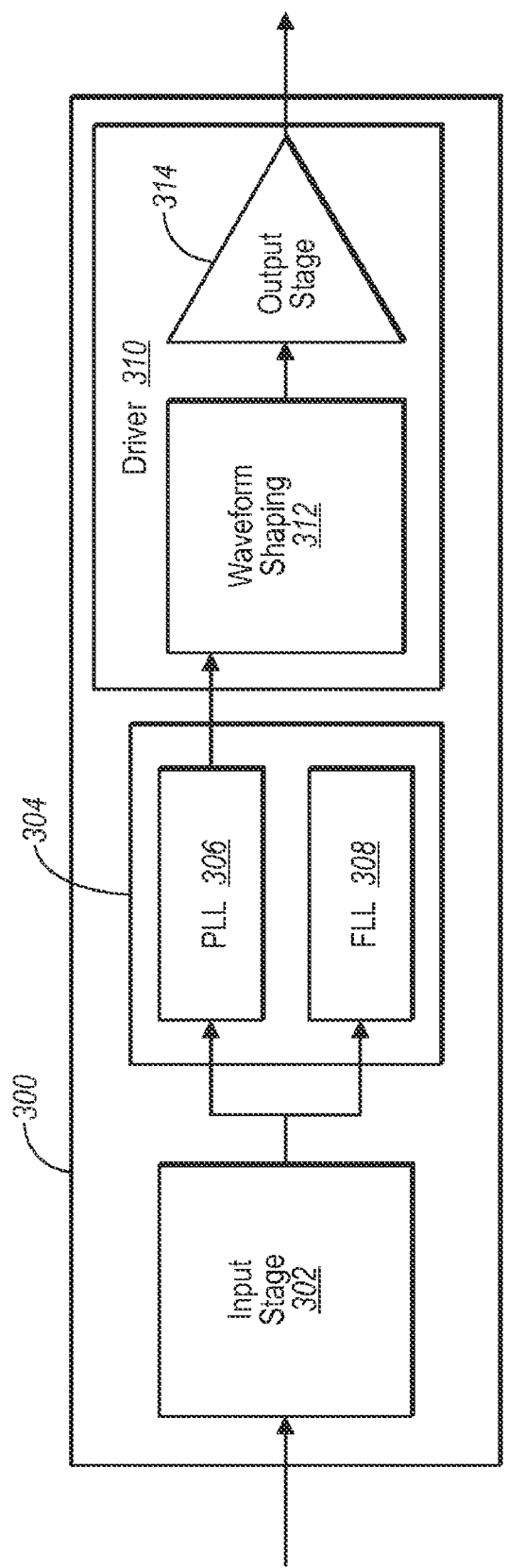
FIG. 3A schematically illustrates an example CDR and driver integrated circuit according to one embodiment of the invention.

One example of an integrated CDR and driver that can be implemented within an ITM 200, 250 according to embodiments of the invention is depicted in FIG. 3A. The integrated CDR and driver 300 includes an input stage 302, a CDR or equalization and retiming stage 304, and a driver stage 310 that includes waveform shaping 312 and an output stage 314. An incoming electrical data signal, which may comprise a differential signal pair, is received at the input stage 302 and provided to the CDR stage 304 for equalization and retiming and/or clock and data recovery. The CDR stage 304 includes a phase-locked loop ("PLL") 306 and frequency-locked loop ("FLL") 308.

Once the electrical signal has been equalized and retimed, it is provided to the driver stage 310 where it can be shaped and optimized for transmission as an optical signal. In one embodiment, the driver stage 310 comprises a high current switching driver, such as a VCSEL modulator capable of driving 50 ohm impedance loads. Further, the driver stage 310 may include waveform shaping features. For instance, in one embodiment of the invention the driver stage 310 is configured to perform one or more of: pre-emphasis, de-emphasis, jitter pre-compensation, asymmetric rise/fall time, asymmetric boost, and the like or any combination thereof. Finally, the equalized, retimed, and reshaped electrical data signal is provided to the output stage 314 for output.

Figure 3B:
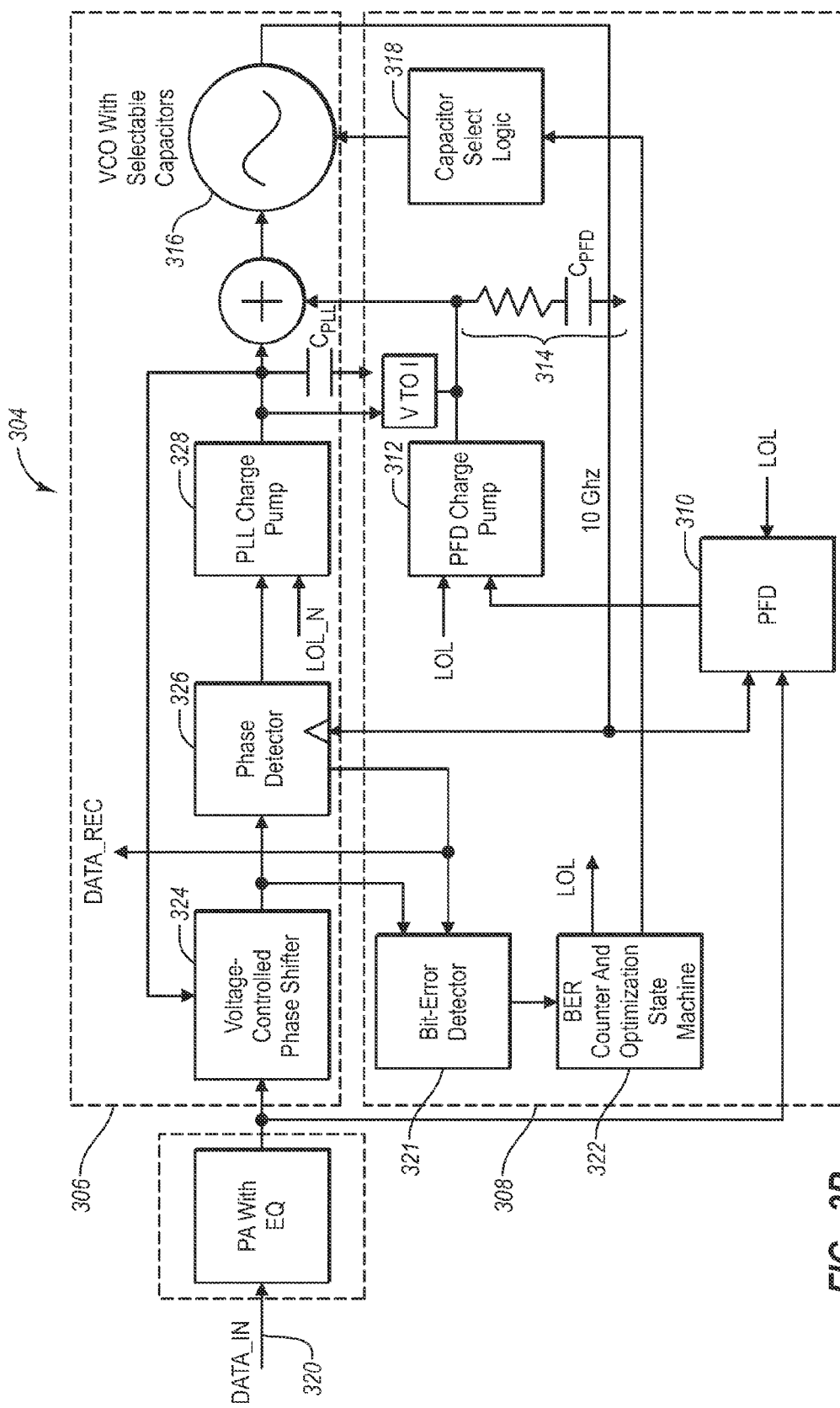
FIG. 3B schematically illustrates one embodiment of a CDR that can be implemented in the CDR and driver integrated circuit of FIG. 3A.

Details regarding the CDR stage 304 are illustrated in FIG. 3B, which illustrates CDR 304 with PLL 306 and FLL 308. The FLL 308 includes a phase frequency detector ("PFD") 310, a PFD charge pump 312, a loop filter 314, a voltage controlled oscillator ("VCO") 316, capacitor select logic 318, a bit-error detector 321, and BER counter 322. The FLL 308 has a broader acquisition range than the PLL 306 and is used to lock the VCO frequency onto the frequency of a reference signal, which in this embodiment comprises the incoming electrical data signal 320. The PFD 310 monitors the reference signal frequency and the VCO frequency, generating a signal indicating a frequency-locked condition when the two frequencies are equal (or within a certain margin).

The PLL 306 includes a voltage-controlled phase shifter 324, a phase detector ("PD") 326, a PLL charge pump 328, and the VCO 316. Once the frequency has been locked, the PLL 306 drives any remaining frequency error to zero and aligns the phase of the clock to the phase of the electrical data signal for the retiming function.

Advantageously, frequency equalization helps reduce jitter generation under band-limited input signal conditions and the use of a separate PLL and FLL reduces the likelihood of false locking. Additionally, the PLL 306 is a dual-loop PLL which provides for low jitter generation and high tolerance. Further, the FLL 308 includes a BER detector 320 and PFD 310 with LOL detect and switch-able capacitors, the combination of which provides for a wide pull-in range over process corner and bit rates. One skilled in the art will additionally appreciate that the capacitor select logic 318 and switch-able capacitors enable dynamic trimming of the VCO 316 at insertion of the electrical signal, thereby eliminating the need to test and trim in the factory.

Returning to FIG. 3A, it will be appreciated by those skilled in the art that the integration of the CDR 304 and driver 310 on a single IC is not a trivial matter; various obstacles must be overcome to ensure proper functioning of the integrated component. For example, operation of a CDR is optimized in a low-noise environment. However, a driver is an inherently high-noise circuit. Consequently, a conventional CDR fabricated on the same die as a conventional driver will not function properly since the noise from the driver can be picked up by the VCO of the CDR, thereby preventing phase detection and/or frequency acquisition.

Accordingly, in some embodiments of the invention the CDR and driver are separately grounded. Furthermore, capacitive couplings can be used to isolate the CDR from the driver.

While FIG. 3A illustrates the CDR 304 and driver 310 as being integrated in a single IC, in other embodiments the CDR and driver can be implemented in separate ICs. Whether implemented with or without a driver, the CDR 304 helps preserve key microwave and/or SONET transmission performance parameters. Thus, data retiming and regeneration (provided by the CDR 304) can be implemented to process SONET signals which typically include phase delay, rise-fall time degradation, BW degradation, and so on.

B. Linear Amplifier

Figure 4:
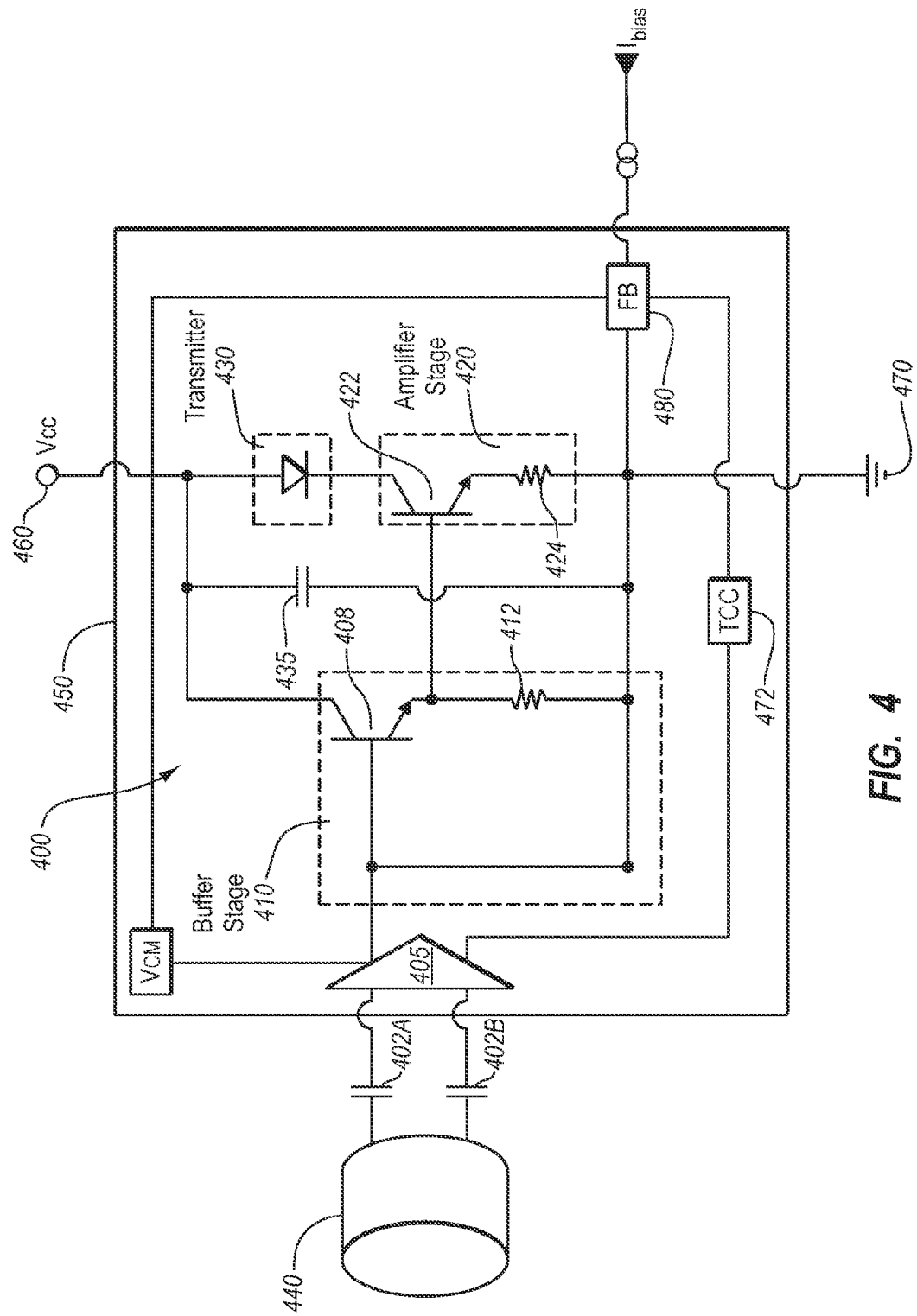
FIG. 4 is a schematic diagram of a linear amplifier, according to one embodiment.

Turning now to FIG. 4, one embodiment of a linear amplifier 400 is depicted that may be implemented in embodiments of the invention. The linear amplifier 400 may correspond to the linear amplifier 406 of FIG. 2A and can be used to drive the transmitter 216 where the modulation signal provided by the integrated CDR and driver 202 is insufficient to properly drive the transmitter, such as in long-wave applications.

The linear amplifier 400 includes a differential to single-end converter stage 405, a buffer stage 410 and an amplifier stage 420 coupled to a transmitter 430, which may correspond to the transmitter 216 of FIG. 2A. A signal is received by first input node 402A and second input node 402B from a driver output stage 440 (which may correspond to the output stage 314 of FIG. 3A). In one embodiment, both input nodes 402A and 402B comprise AC-coupling capacitors, although this is not required in all embodiments. In the illustrated embodiment, the driver output stage 440 is illustrated as a current mode logic output stage. The current mode logic output stage is a differential output stage with two complementary output nodes, thus allowing the output stage 440 to take advantage of the speed and signal advantages of a differential output.

The differential signal is converted by stage 405 which also provides as an input termination for the previous driving stage, which is the CDR's output in this embodiment. A component of the differential signal is provided to the base terminal of a first bipolar transistor 408. The other component of the differential signal is used to drive the thermal chirp compensation ("TCC") circuit. It can also be left unused if TCC is not required. Additionally, the buffer stage 410 includes a first resistor 412 coupled to the emitter terminal of the first transistor 408. The first resistor 412 is used to bias the first transistor 408.

The buffer stage is coupled to the amplifier stage 420. In the present embodiment, this is accomplished by coupling the emitter terminal of the first transistor 408 to the base terminal of a second bipolar transistor 422 within the amplifier stage. The emitter terminal of the second transistor 422 is coupled to a signal ground 470 which does not need to be an RF ground. This can be achieved, in one embodiment, by providing carefully designed decoupling circuits from supply node 460 to signal ground node 470. An example of such decoupling circuits is shown here as a decoupling capacitor 435. A first terminal of the decoupling capacitor 435 is coupled to the collector terminal of the first bipolar transistor 408 and to a first terminal of the transmitter 430. A second terminal of the decoupling capacitor 435 is coupled to the signal ground 470. Though not shown here in this specific example, a person knowledgeable in the art of electronics can envision that realistically a more complicated decoupling network is required to address different ranges of frequencies of interest. It is also conceivable that in addition to capacitors the decoupling circuit may consist of resistors as well as inductors, which are not illustrated in the present embodiment.

The buffer stage 410 and the amplifier stage 420 are both coupled to the transmitter 430. In particular, the first terminal of the transmitter 430 is coupled to the collector terminal of the first bipolar transistor 408, the first terminal also being configured to be coupled to a voltage source 460. The voltage source 460 provides current to the circuit 400. A second terminal of the transmitter 430 is coupled to the collector terminal of the second bipolar transistor 422.

In operation, a differential signal is received from the driver output stage 440 by the buffer stage 410. The buffer stage 410 provides the signal to the amplifier stage 420, sending it from the emitter terminal of the first transistor 408 to the base terminal of the second transistor 422. The second transistor pulls current through the transmitter 430, the magnitude of the current pulled through the transmitter being directly proportional to the current received from the first transistor 408. Accordingly, the signal received from the first transistor 408 is amplified by the second transistor 422 and the transmitter 430 emits an optical signal representative of the amplified signal. The electrical signals are returned to signal ground 470, the signal ground 470 being separate from a header or chassis ground.

It should be noted that the specific example described above utilizes bipolar transistors. Note, however, that the function can also be implemented with field-effect transistors without altering the theory, spirit and advantages of the invention.

Although not required in all embodiments, in the embodiment shown the circuit 400 includes a thermal chirp compensation ("TCC") circuit 472 for use with a laser with managed chirp. The TCC circuit may include a low pass filter and a gain stage and is configured to receive one of a differential signal pair (e.g., databar) in order to maintain operation of the laser with managed chirp at a certain wavelength. While described in more detail below, such a laser functions by managing the chirp of a DFB laser.

Chirp is the frequency modulation of an emitted optical signal resulting when a transmitter is directly modulated. Three types of chirp are exhibited by a directly modulated DFB laser: (1) transient chirp, (2) adiabatic chirp, and (3) thermal chirp. Transient chirp has a short-term damped oscillatory behavior and occurs at 1-to-0 and 0-to-1 bit transitions. Transient chirp is usually undesirable, but can be controlled to manageable levels through proper biasing of the transmitter. Adiabatic chirp is proportional to optical intensity, causing 1 bits to be blue-shifted relative to 0 bits. While undesirable in many instances, adiabatic chirp can be managed, and in fact is central to using a laser with managed chirp, as described below. Thermal chirp has the opposite sign of adiabatic chirp and has a delayed response to an applied current, the response increasing exponentially in time. Thermal chirp is generally undesirable.

Thermal chirp is affected by the mark density of a bit sequence. As used herein, "mark density" is the ratio of the number of 1 bits to the total number of bits that occur in a time period much longer than the bit period. For a truly random digital sequence, the mark density is ½ when averaged over a long period of time (e.g., seconds). However, the sequence may have segments in time where the local mark density, measured over a shorter period (e.g., nanoseconds) is higher or lower than the average. When a DFB laser is modulated by a random sequence, a high density of 1's will tend to heat the laser since the average injection current is increased. Conversely, a high density of 0's will tend to decrease the temperature of the active region of the DFB laser.

The laser frequency of a DFB laser changes with change in temperature because the refractive index of the semiconductor material is a function of temperature. Hence, the temperature of the laser and its optical frequency tend to wander over time in response to short term changes in the mark density of the random sequence. When the DFB is used as a laser with managed chirp, an optical spectrum reshaper ("OSR") converts this frequency wander to amplitude wander. Consequently, thermal chirp causes the amplitude of the 1 and 0 bits to change slowly at the output of the laser with managed chirp depending on the mark density of the applied sequence, and is undesirable in such a system.

This frequency wander can also cause another deleterious effect in data links with long lengths of optical fiber. Since the fiber is dispersive (i.e., since the velocity of light in the fiber varies with optical frequency), the frequency wander caused by thermal chirp can cause variations in the arrival time of the bits at the receiver. For normally dispersive fiber (i.e., positive dispersion), bits following a high density of 1's will arrive a little late because of the red shift induced by laser heating. On the other hand, bits following a high density of 0's will arrive a little early because of the blue shift induced by laser cooling. In other words, thermal chirp induces a pattern-dependent timing jitter in data links containing long lengths of dispersive fiber.

To compensate for thermal chirp, DATABAR is provided to the TCC circuit 472. The TCC circuit 472 uses databar to identify long strings of 1s or 0s and maintains a desired chirp by compensating via an externally biased feedback loop 480, which can adjust the transmit power of the transmitter 430 up or down as needed to maintain the desired chirp.

C. Laser With Managed Chirp

Figure 5:
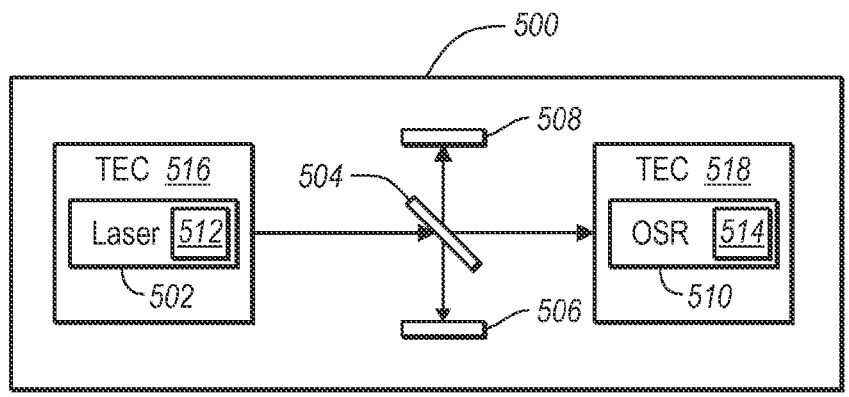
FIG. 5 schematically depicts one embodiment of a laser with chirp that is managed according to embodiments of the invention.

Turning now to FIG. 5, one embodiment of a laser with chirp that is managed is illustrated that can be implemented in embodiments of the invention. The laser with managed chirp 500 may correspond to the transmitter 216 of FIG. 2A. The primary components of the module 500 are an optical signal source 502 such as a DFB laser and an optical spectrum reshaper ("OSR") 510 or multi-cavity etalon filter. Basically, the OSR 210 converts a frequency modulated signal of the optical signal source 502 to an amplitude modulated signal and additionally introduces phase correlation between the bits of the signal.

The laser with managed chirp 500 additionally includes supporting optics and various electronic components. The supporting optics include a beam splitter 504 and power and wavelength detecting photodiodes 506 and 508. The electronic components include a first thermistor 512 for monitoring the temperature of the laser 502, a second thermistor 514 for monitoring the temperature of the OSR 510, a first thermoelectric cooler ("TEC") 516 for regulating the temperature of the laser 502, and a second TEC 518 for regulating the temperature of the OSR 510.

In one embodiment, the laser 502 is a directly modulated DFB laser, while in another embodiment the laser 502 is an externally modulated DFB laser. Alternately or additionally, the laser 502 may comprise a LIM, in which case the TEC 518, OSR 510, and thermistor 514 would not be needed to practice the invention. Alternately or additionally, the laser 502 may comprise a 1550 nm VCSEL with a 30 mA maximum bias current, in which case it would be unnecessary to cool the laser 502 (e.g., no need for the TEC 516 and thermistor 512), and the output of a CDR and driver IC would be sufficient to drive the laser 502 without a linear amplifier, as in the configuration of FIG. 2B.

A module 500 manages the chirp of a transmitter to optimize a signal produced by the transmitter. As mentioned above, when a semiconductor transmitter such as a DFB is directly modulated, three types of chirp are exhibited: Transient chirp, which occurs at bit transitions and hastens pulse spreading in fibers with positive dispersion; adiabatic chirp, which makes 1 bits blue-shifted relative to 0 bits; and thermal chirp, which has the opposite sign of adiabatic chirp and increases exponentially in time. Conventional directly modulated transmitters are biased near threshold, in which case transient chirp dominates and prevents the use of the directly modulated transmitters in long-haul applications due to pulse spreading, which results in rapid distortion in the eye after propagation.

According to one embodiment of the invention, however, the laser 502 is biased high above threshold to reduce transient chirp, which also leads to a low extinction ratio at the laser output. While transient chirp is reduced, the low extinction ratio at the laser output is problematic for signal propagation. In the present embodiment, the extinction ratio can be increased using the OSR 510. The OSR 510 is a filter with a transmission window configured to discriminate between blue-shifted 1 bits and red-shifted 0 bits. Consequently, the OSR 510 can transmit 1 bits with little or no loss while attenuating 0 bits to increase the extinction ratio of the signal. In addition, the OSR 510 forms a wavelength locker together with the two photodiodes 506, 508 and the beam splitter 504. Thermal chirp can be managed as described above using a thermal chirp compensation circuit.

Advantageously, adiabatic chirp, together with the OSR 510, introduces phase correlation between the bits, which increases dispersion tolerance and reduces the information bandwidth by a factor of two. Consider a "1 0 1" bit sequence at 10G where 1 bits have 5 GHz higher frequency than 0 bits. The phase of the carrier slips by $2\pi \times 5$ GHz$\times 100$ ps$=\pi$ during the 0 bit, making the second 1 bit $\pi$ out of phase with the first. Normally dispersion closes the eye by spreading the energy of the 1 bits into adjacent 0 bits. Here, the bits interfere destructively in the middle 0 bit because of the 71 phase shift, keeping the eye open after fiber propagation.

The wavelength locker can be operated by detecting a photocurrent from each of the photodiodes 506 and 508. The photocurrents are provided to an internal or external microcontroller which can use a lookup table to determine the wavelength of the emitted signal based on the photocurrents. A temperature measurement from the thermistor 514 is used by the microcontroller to determine the transmission window of the OSR 510. The transmission window can be changed and the wavelength of the signal locked onto by changing the temperature of the OSR using the TEC 518. Alternately or additionally, the wavelength of the emitted signal can be changed by increasing or decreasing the temperature of the transmitter 502 using the TEC 516.

D. Microcontroller

Figure 6:
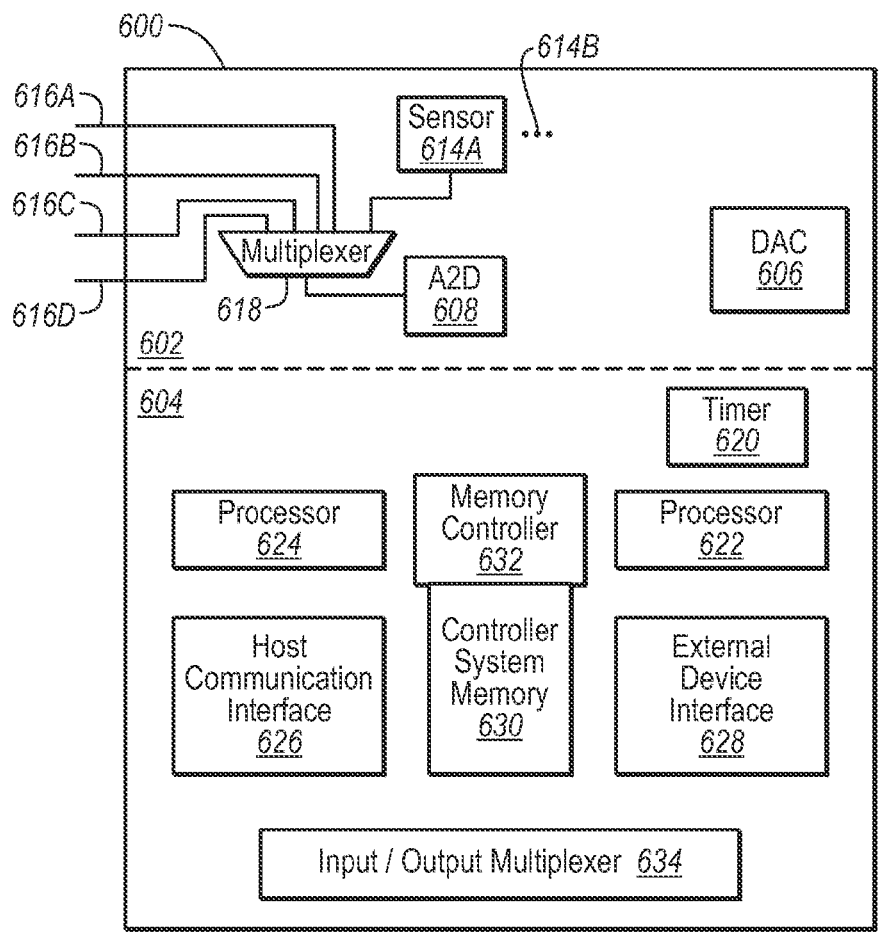
FIG. 6 is a schematic diagram of a microcontroller according to one embodiment.

With reference now to FIG. 6, one embodiment 600 of a microcontroller is illustrated that can be integrated within an intelligent transmitter module or implemented in conjunction therewith. In the embodiment illustrated in FIG. 6, the microcontroller 600 includes both an analog portion 602 and a digital portion 604 that together allow the microcontroller to implement logic digitally, while still largely interfacing with other components (e.g., a laser with managed chirp) using analog signals.

The analog portion 602 may contain digital to analog converters ("DACs") 606, analog to digital converters ("A2Ds") 608, high speed comparators (e.g., for event detection), voltage based reset generators, voltage regulators, voltage references, a clock generator, and other analog components. The analog portion 602 may also include sensor 614A amongst potentially others as represented by the horizontal ellipses 614B. Each of these sensors may be responsible for measuring operational parameters such as, for example supply voltage and transceiver temperature. The microcontroller 600 may also receive external analog signals from a laser with managed chirp and/or other components in order to monitor the laser with managed chirp. Four external lines 616A, 616B, 616C and 616D are illustrated for receiving such external analog signals, although there may be many of such lines. According to one embodiment of the invention, each of the external lines receives one of the photocurrents from the photodiodes 506, 508 or one of the temperatures from the thermistors 512, 514 of FIG. 5.

The internal sensors 614A through 614B may generate analog signals that represent the measured values. In addition, the externally provided signals 616A through 616D may also be analog signals. In this case, the analog signals are converted to digital signals so as to be available to the digital portion 604 of the controller 600 for further processing. Of course, each analog parameter value may have its own A2D. However, to preserve chip space, each signal may be periodically sampled in a round robin fashion using a single A2D such as the illustrated A2D 608. In this case, each analog value may be provided to a multiplexer 618, which selects in a round robin fashion, one of the analog signals at a time for sampling by the A2D 608. Alternatively, multiplexer 618 may be programmed to allow for any order of analog signals to be sampled by the A2D 608.

The digital portion 604 of the control module 600 may include a timer module 620 that provides various timing signals used by the digital portion 604. Such timing signals may include, for example, programmable processor times. The timer module 620 may also act as a watchdog timer or countdown timer.

Two general purpose processors 622 and 624 are also included. The processors recognize instructions that follow a particular instruction set, and may perform normal general-purpose operations such as shifting, branching, adding, subtracting, multiplying, dividing, Boolean operations, comparison operations, and the like. In one embodiment, the general-purpose processors 622 and 624 are each a 16-bit processor and may be identically structured. The precise structure of the instruction set is not important to the principles of the present invention as the instruction set may be optimized around a particular hardware environment, and as the precise hardware environment is not important to the principles of the present invention.

A host communication interface 626 can optionally be implemented to communicate with a host using, for example, serial data (SDA) and serial clock (SCL) lines of an I²C interface, although other interfaces, including SPI, MDIO, 1-wire, and the like or any combination thereof may also be used. An external device interface 628 can be implemented to communicate with other modules within an intelligent transmitter module such as the integrated CDR and VCSEL driver and/or linear amplifier as well as to communicate with other modules within an optical transceiver or transponder, such as a post-amplifier, and the like.

The internal controller system memory 630 may be random access memory (RAM) or nonvolatile memory. While system memory 630 may be RAM, it may also be a processor, register, flip-flop or other memory device. The memory controller 632 shares access to the controller system memory 630 amongst each of the processors 622, 624, the host communication interface 626 and the external device interface 628. According to one embodiment of the invention, information can be logged within the system memory 630 and later retrieved for diagnosing an intelligent transmitter module or other device within which the microcontroller 600 is implemented.

An input/output multiplexer 634 multiplexes the various input/output pins of the microcontroller 600 to the various components within the microcontroller 600. This enables different components to dynamically assign pins in accordance with the then-existing operational circumstances of the microcontroller 600. Accordingly, there may be more input/output nodes within the microcontroller 600 than there are pins available on the microcontroller 600, thereby reducing the footprint of the microcontroller 600.

As previously mentioned, the microcontroller 600 can be implemented on its own IC within an optoelectronic device or can be integrated on the same IC as an integrated CDR and driver and/or linear amplifier. Integrating the microcontroller into an IC with these other components is not simply a matter of fabricating a conventional microcontroller on the same die as a conventional CDR, driver, and/or linear amplifier. For instance, high speed signals within the digital core 604 can interfere with functions performed by the aforementioned components. Additionally, noise from the driver can interfere with the analog portion 602. For this reason, the analog and or digital portions of the microcontroller 600 may be capacitively coupled and/or ground separation can be provided.

Additionally, when implemented in conjunction with a laser with managed chirp for high speed (e.g., 10G and higher) and long haul optical communication, functionality and capabilities beyond those currently offered by conventional microcontrollers can be included in the microcontroller. Proper operation of a laser with managed chirp at high speeds involves rapid and repetitious reading of the temperatures of one or more TECs, reading the photocurrent from two or more photodiodes, updating the VCSEL driver to maintain a particular extinction ratio, communicating with the CDR to ensure data flow, communicating with a TCC circuit to adjust gain, and the like. Accordingly, the microcontroller includes two processors 624, 622 that enable proper processing of incoming and outgoing control data. For example, in one embodiment, one of the processors handles all high speed processes while the other processor handles all low speed processes in the background.

In the present embodiment, proper operation of the laser with managed chirp requires measuring the temperature of the TECs to an accuracy of ±0.1 degrees Celsius. However, conventional microcontrollers are only able to measure temperature to an accuracy of approximately ±3 degrees Celsius because the A2Ds used only have 10-bit resolution. Accordingly, the present embodiment of the invention implements a 14-bit or higher A2D. In one embodiment, the 14-bit or higher A2D is implemented as a single chip. Alternately or additionally, 14-bit resolution can be achieved by using an external differential amplifier to amplify a signal before providing it to a 10-bit amplifier.

Additionally, relative to a general purpose microcontroller, the microcontroller 600 can be simplified in some respects to optimize its functionality within an intelligent transmitter module. For instance, custom hardware could be used to read temperature many times very quickly with possible averaging. The custom hardware could then report the average temperature to the microcontroller 600. The microcontroller 600 could then run slower (saving power and reducing noise) while still being able to accurately read and act on the laser temperature. Thus, the microcontroller 600 can be customized to perform the operations that are most relevant for a given implementation.

Figure 7A:
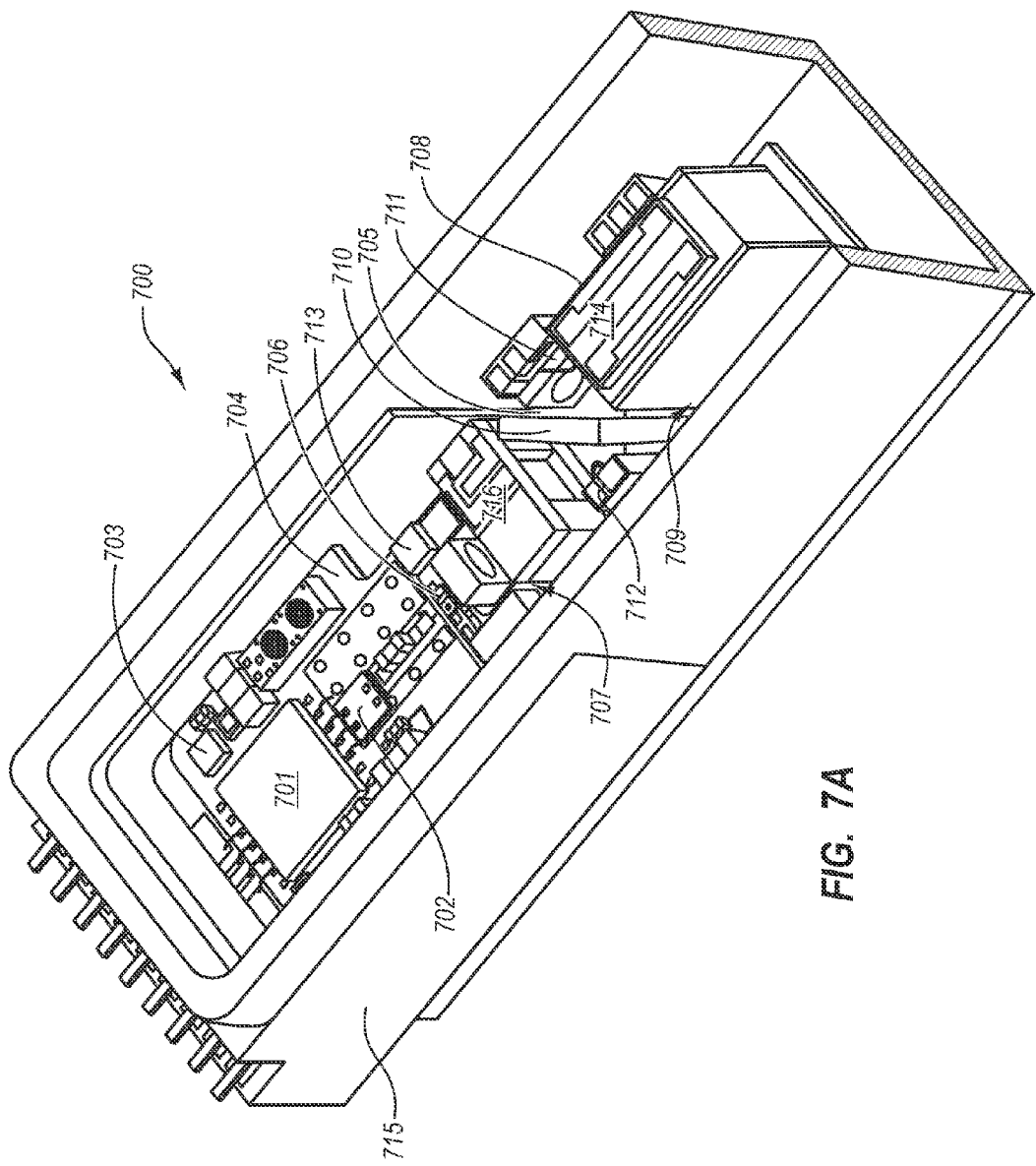
FIGS. 7A and 7B isometrically illustrate embodiments of an intelligent transmitter module using a DFB laser and a VCSEL, respectively.
Figure 7B:
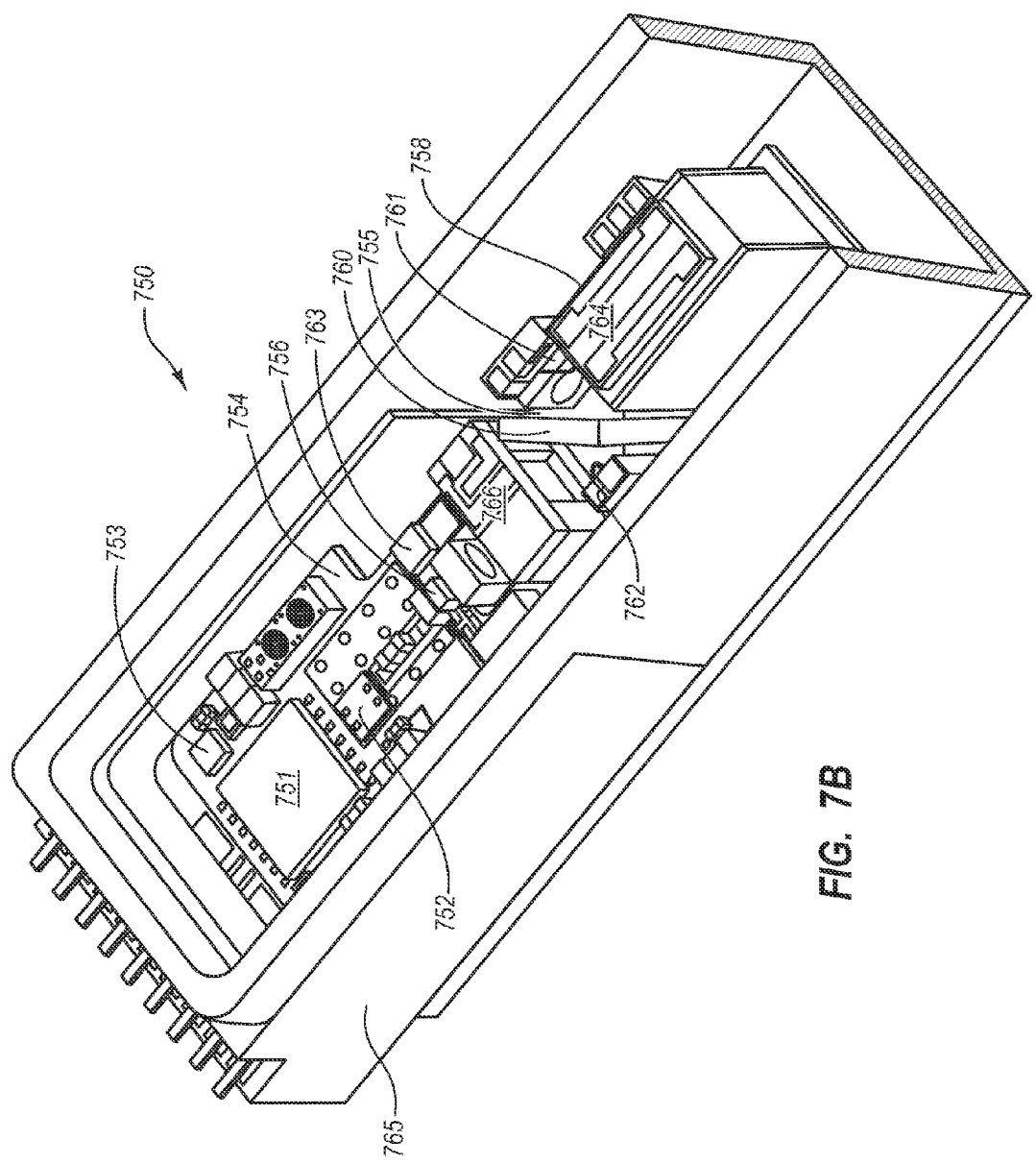

With reference now to FIGS. 7A and 7B, embodiments of an intelligent transmitter module according to the invention are illustrated. FIG. 7A is an isometric view of an ITM 700 that implements a DFB laser, while FIG. 7B is an isometric view of an ITM 750 that implements a VCSEL.

In FIG. 7A, the ITM 700 comprises a CDR, driver and microcontroller IC 701 that includes one or more DACs, a linear amplifier IC 702, and a 14 or 16 bit A/D converter IC 703 on a first substrate 704, and a laser with managed chirp mounted on a second substrate 705. The laser with managed chirp comprises a DFB transmitter 706 on a first TEC 707, an OSR 708 on a second TEC 709, a beam splitter 710, two photodiodes 711 and 712, and two thermistors 713 and 714. The ITM further includes a shell or housing 715 for enclosing the electronic and optical components, and an isolator 716 configured to reduce back reflections into the DFB transmitter 706.

FIG. 7B illustrates ITM 750 comprising a CDR, driver and microcontroller IC 751 that includes one or more DACs, a linear amplifier IC 752, and a 14 or 16 bit A/D converter IC 753 on a first substrate 754, and a laser with managed chirp mounted on a second substrate 755. The laser with managed chirp comprises a 1550 NM VCSEL 756 on a first TEC, an OSR 758 on a second TEC, a beam splitter 760, two photodiodes 761, 762, and two thermistors 763 and 764. The ITM further includes a shell or housing 765 for enclosing the electronic and optical components, and an isolator 766.

Figure 8:
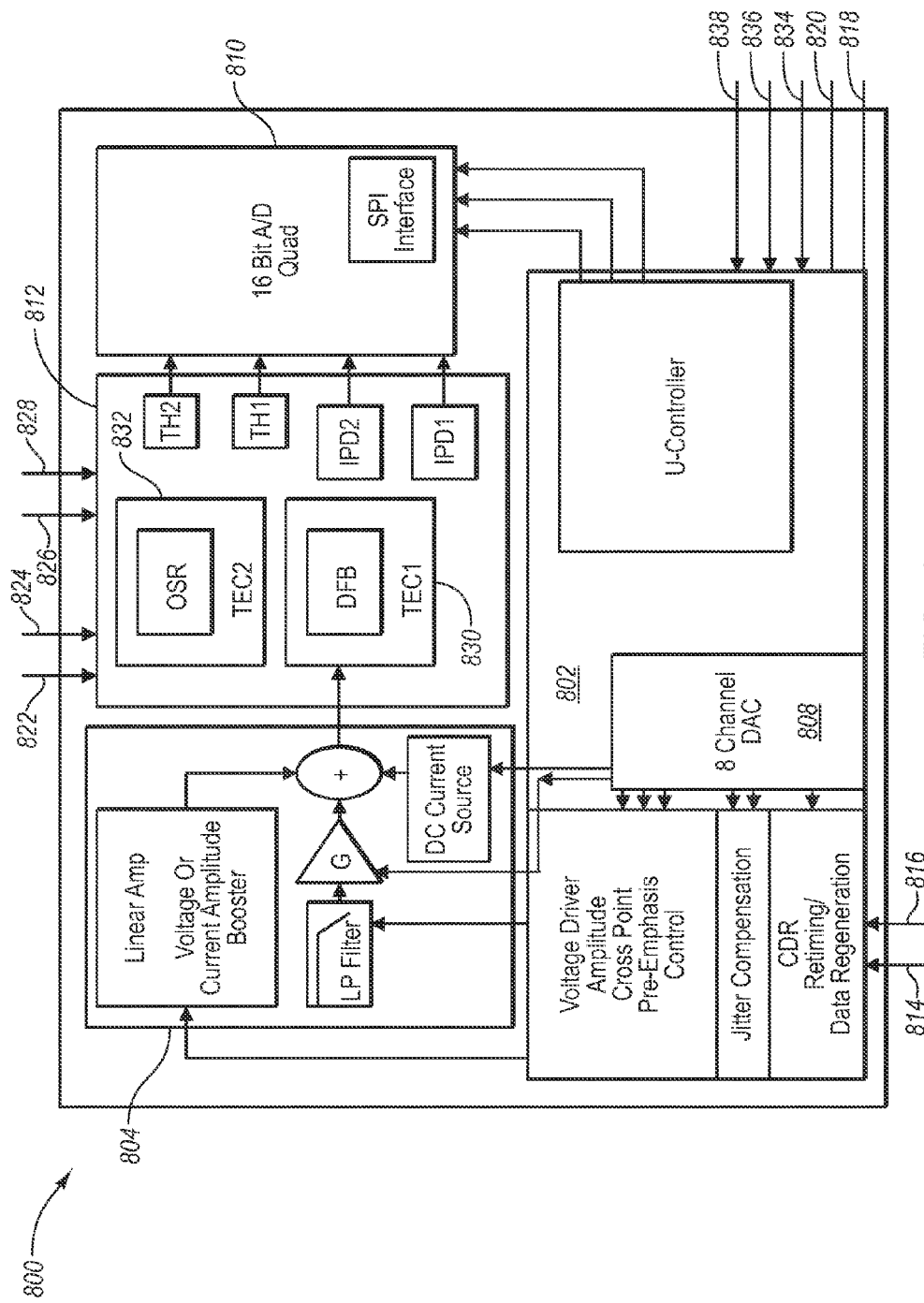
FIG. 8 schematically illustrates the intelligent transmitter module of FIG. 7A.

FIG. 8 depicts the ITM 700 of FIG. 7A in abstract blocks as ITM 800 and further illustrates the electrical I/O of the ITM 800. Similar to the ITM 700, the ITM 800 includes various ICs, such as a CDR, driver and microcontroller IC 802, a linear amplifier IC 804, and a 16 bit A/D converter IC 810, all of which can be implemented separately as shown or integrated into two or less ICs. Additionally, the ITM 800 includes a laser with managed chirp 812.

The ITM 800 further includes an 8-channel DAC 808. Although the A/Ds (and the DAC in FIG. 8) are illustrated separately from the microcontroller in FIGS. 7A, 7B and 8, in other embodiments the A/Ds (and/or the DAC) may be incorporated into the microcontroller, as described above with respect to FIG. 6.

FIG. 8 further illustrates the inputs required to operate one embodiment of an ITM. In particular, the ITM 800 can have as few as three high speed lines, including two inputs 814, 816 to receive a high-speed differential signal and one ground line 818 for ground. The ITM 800 additionally has eight low speed lines, including one input 820 for the bias current, two inputs 822 and 824 to control TEC1 830, two inputs 826 and 828 to control TEC2 832, and three lines 834, 836 and 838 provided as an interface (e.g., SPI) with the microcontroller.

The integration of one or more electronic components (including the CDR, driver, linear amplifier, and microcontroller) within an intelligent transmitter module enables numerous benefits and advantages over the prior art. For instance, an ITM according to embodiments of the invention has fewer electronic interconnects (see FIG. 8) compared to a conventional transmitter optical subassembly. In addition, electronic components bonded to and/or manufactured on the same substrate can share a common ground. Further, the distance between the substrate with the electronic components and the substrate with the transmitter can be minimized since both are packaged within the ITM. The reduction in interconnects, the common ground, and the minimized distance over which the modulated electrical signal has to travel combine to reduce signal degradation, bandwidth reduction, jitter, etc. caused by reflection and parasitic capacitance pickup, which significantly improves the microwave performance of the ITM.

Another benefit of minimizing the distance between the CDR/driver (and optionally the linear amplifier) and optical transmitter is that impedance matching is not required. In a conventional transceiver or transponder, the CDR, driver (and/or linear amplifier) are implemented on a PCB a significant distance from the optical transmitter, which is usually hermetically sealed within a TOSA package. Accordingly, long transmission lines in the form of traces and/or flex circuits electrically couple the CDR, driver and/or linear amplifier to the TOSA package. Due to the length of the transmission lines, the load and source have to be impedance matched. In contrast, with the CDR/driver IC, and optionally linear amplifier, inside an ITM package with the optical transmitter, transmission lines between the CDR/driver and optical transmitter are relatively short and the need to impedance match is eliminated. Consequently, less power is consumed by the CDR and driver in an ITM than by a CDR and driver external to a TOSA.

As another benefit, an intelligent transmitter module packaged within a metal exterior or shell improves containment of electromagnetic interference ("EMI") by confining the electronic circuitry of the CDR and driver (and optionally the linear amplifier and/or microcontroller) within a Faraday cage (e.g., the metal exterior). Further, flip chip bonding of the ICs advantageously reduces mutual inductive coupling (crosstalk) and emissions. Additionally, the micro-electronic integration of components within the ITM reduces manufacturing costs and increases the control and capabilities of the ITM.

Finally, the removal of the CDR, driver, and optionally linear amplifier and/or the microcontroller, from their conventional location on a PCB external to a TOSA into an ITM frees up space on the PCB and/or within an optoelectronic device for other components, such as a field programmable gate array, a digital signal processor, a memory chip, a digital diagnostic IC, a wireless and/or RF interface for interoperability communications (e.g., RF on fiber), video electronic circuitry, a variable optical attenuator, a semiconductor optical amplifier, an optical MUX and/or DEMUX, an optical power monitoring device, a polarization controller, and the like or any combination thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An intelligent transmitter module configured for transmitting optical data signals over distances exceeding 100 kilometers, comprising:
   a clock and data recovery circuit configured to receive, equalize, and retime a differential electrical data signal from a host;
   a driver electrically coupled to the clock and data recovery circuit and configured to generate a modulation signal representative of the differential electrical data signal;
   a linear amplifier electrically coupled to the driver, wherein the linear amplifier amplifies the modulation signal in order to drive an optical transmitter; and
   the optical transmitter, wherein the optical transmitter is electrically coupled to the linear amplifier and is configured to emit an optical signal representative of the amplified modulation signal.

2. The intelligent transmitter module of claim 1, further comprising a thermal chirp compensation circuit, wherein the thermal chirp compensation circuit compensates for thermal chirp induced frequency drift in the signal emitted by the optical transmitter by adjusting the transmit power of the optical transmitter.

3. The intelligent transmitter module of claim 2, wherein the thermal chirp compensation circuit comprises a low pass filter and a gain stage.

4. The intelligent transmitter module of claim 1, wherein the intelligent transmitter module is hermetically sealed within a faraday cage.

5. The intelligent transmitter module of claim 1, wherein the driver provides wave-form shaping of the modulation signal, including one or more of: pre-emphasis, de-emphasis, jitter compensation, cross point adjust, modulation amplitude adjust, polarity control, rise time adjust, fall time adjust, and laser bias control.

6. The intelligent transmitter module of claim 1, wherein the linear amplifier comprises a buffer stage and an amplifier stage.

7. The intelligent transmitter module of claim 1, wherein the optical transmitter comprises:
- an optical signal source for emitting the optical signal representative of the amplified modulation signal;
- an optical spectrum reshaper disposed in the path of the emitted optical signal and configured to increase the extinction ratio of the optical signal;
- a beam splitter disposed along the path of the optical signal between the optical signal source and the optical spectrum reshaper;
- two photodiodes, the photodiodes being disposed on opposite sides of the path of the optical signal such that portions of the optical signal that are split and redirected by the beam splitter from the optical signal are received by the photodiodes;
- two thermistors thermally coupled to the optical signal source and the optical spectrum reshaper for monitoring the temperatures of the optical signal source and the optical spectrum reshaper; and
- two thermoelectric coolers thermally coupled to the optical signal source and the optical spectrum reshaper for regulating the temperatures of the optical signal source and the optical spectrum reshaper.

8. The intelligent transmitter module of claim 7, further comprising a microcontroller configured to control operation of the intelligent transmitter module by one or more of:
- monitoring and adjusting the temperature of the optical signal source, optical spectrum reshaper, or both by adjusting the temperature of one or both of the thermoelectric coolers;
- adjusting settings on the clock and data recovery circuit; and
- adjusting settings on the driver.

9. An intelligent transmitter module, comprising:
- a first substrate having bonded thereto:
    - a first integrated circuit including:
        - a clock and data recovery portion for equalizing and retiming an electrical data signal; and
        - a driver portion electrically coupled to the clock and data recovery portion and configured to generate a modulated signal representative of the electrical data signal; and
    - a linear amplifier integrated circuit electrically coupled to the driver portion of the first integrated circuit and configured to receive and amplify the modulated signal; and
- a second substrate having manufactured thereon an optical transmitter, wherein the optical transmitter is electrically coupled to the linear amplifier integrated circuit and is configured to emit an optical data signal representative of the electrical data signal.

10. The intelligent transmitter module of claim 9, wherein the first substrate comprises one or more of: a multi-layer high frequency laminate substrate, a hybrid ceramic substrate, and a thin film substrate.

11. The intelligent transmitter module of claim 9, wherein transmission lines between the first integrated circuit, the linear amplifier, and the optical transmitter are not impedance matched.

12. The intelligent transmitter module of claim 9, wherein the first integrated circuit and linear amplifier integrated circuit are bonded to the first substrate using one or more of: flip chip bonding, wire bonding, surface mount technology, or through hole construction.

13. The intelligent transmitter module of claim 9, wherein the first substrate is thermally isolated from the second substrate.

14. The intelligent transmitter module of claim 9, wherein the intelligent transmitter module is implemented in a long haul application requiring transmission of the optical data signal over a distance exceeding 100 kilometers at a data rate exceeding 9 gigabits per second.

15. The intelligent transmitter module of claim 9, wherein the first integrated circuit further includes a microcontroller portion having a plurality of analog to digital channels for receiving temperature data and photocurrent data from the optical transmitter, and a plurality of digital to analog channels for providing control signals to components of the intelligent transmitter module.

16. The intelligent transmitter module of claim 15, wherein the microcontroller includes an analog to digital converter having an accuracy of fourteen bits or more.

17. The intelligent transmitter module of claim 9, wherein the second substrate further has manufactured thereon an optical spectrum reshaper adapted to reshape the emitted optical data signal into a second optical data signal.

18. The intelligent transmitter module of claim 17, wherein the optical spectrum reshaper reshapes the emitted optical data signal by converting frequency modulation of the emitted optical data signal to amplitude modulation of the second optical data signal.

19. The intelligent transmitter module of claim 17, wherein the optical spectrum reshaper converts an adiabatic chirp profile of the emitted optical data signal to a flat-topped chirp profile of the second optical data signal, thereby increasing dispersion tolerance of the second optical data signal.

20. The intelligent transmitter module of claim 17, wherein the optical transmitter comprises a distributed feedback laser biased high above threshold to reduce transient chirp of the distributed feedback laser relative to being biased near threshold.

21. An intelligent transmitter module adaptable for use with two or more optical communication protocols, comprising:
- a clock and data recovery circuit with a bypass mode, wherein the clock and data recovery circuit is configured to equalize and retime a data signal received from a host unless a bypass control signal is received;
- a vertical cavity surface emitting laser driver electrically coupled to the clock and data recovery circuit and configured to generate a modulated signal representative of the data signal;
- an optical transmitter electrically coupled to the driver and configured to emit an optical signal representative of the modulated data signal; and
- a microcontroller configured to optimize operation of the intelligent transmitter module, wherein the microcontroller optimizes operation of the intelligent transmitter module by one or more of:
    - monitoring and regulating the temperature of the optical transmitter;

monitoring and regulating the wavelength of the optical signal emitted by the optical transmitter;

adjusting settings on the clock and data recovery circuit; and adjusting settings on the vertical cavity surface emitting laser driver; and wherein the clock and data recovery circuit, driver, optical transmitter, and microcontroller are packaged within a hermetically sealed Faraday cage.

22. The intelligent transmitter module of claim 21, wherein the intelligent transmitter module is included within an XFP form factor transceiver, an SFP+ form factor transceiver, or a SONET transponder.

23. The intelligent transmitter module of claim 21, wherein the optical transmitter comprises one or more of: a vertical cavity surface emitting laser, a distributed feedback laser, an externally modulated laser, and a directly modulated laser.

24. The intelligent transmitter module of claim 21, wherein the microcontroller includes a plurality of processors.

25. The intelligent transmitter module of claim 21, wherein the driver is further configured to shape the equalized and retimed data signal using one or more waveform shaping features.

26. An intelligent transmitter module adaptable for use with two or more optical communication protocols, comprising:

a clock and data recovery circuit with a bypass mode, wherein the clock and data recovery circuit is configured to equalize and retime a data signal received from a host unless a bypass control signal is received;

a vertical cavity surface emitting laser driver electrically coupled to the clock and data recovery circuit and configured to generate a modulated signal representative of the data signal;

an optical transmitter electrically coupled to the driver and configured to emit an optical signal representative of the modulated data signal;

an amplifier electrically coupled between the driver and the optical transmitter and configured to linearly amplify the modulated signal prior to receipt of the modulated signal by the optical transmitter: and a microcontroller configured to optimize operation of the intelligent transmitter module:

wherein the clock and data recovery circuit, driver, optical transmitter, and microcontroller are packaged within a hermetically sealed Faraday cage.

* * * * *